United States Patent [19]

Sugiyama

[11] Patent Number: 4,770,428

[45] Date of Patent: Sep. 13, 1988

[54] LOADING DEVICE OF LP GAS CYLINDERS

[76] Inventor: Sokichi Sugiyama, 256, Aza Warigo, Ooaza Yokouchi, Komaki City, Aichi Prefecture, Japan

[21] Appl. No.: 17,344

[22] Filed: Feb. 20, 1987

[30] Foreign Application Priority Data

Oct. 30, 1986 [JP] Japan .................. 61-167355

[51] Int. Cl.$^4$ .............................. B60K 15/08
[52] U.S. Cl. ............... 280/5 A; 224/42.44; 248/140; 248/313; 414/462
[58] Field of Search ............ 414/462; 280/5 R, 5 A; 224/42.38, 42.39, 42.43, 42.44; 248/130, 139, 140, 154, 311.2, 313; 211/72, 81; 410/31, 32, 34, 35, 36, 38, 39, 40, 42, 47, 78, 79

[56] References Cited

U.S. PATENT DOCUMENTS

| 1,639,563 | 8/1927 | Hays | 224/42.39 |
| 2,273,504 | 2/1942 | Beimer | 248/140 |
| 2,404,513 | 7/1946 | McCabe | 211/71 |
| 2,497,597 | 2/1950 | Gatewood | 224/42.38 |
| 2,615,238 | 10/1952 | Highwood | 248/154 X |
| 3,790,183 | 2/1974 | Price | 414/462 X |
| 3,791,403 | 2/1974 | Folkerth | 248/313 X |
| 4,025,080 | 5/1977 | Gedeon | 414/462 X |
| 4,059,281 | 11/1977 | Evans | 280/5 A |

FOREIGN PATENT DOCUMENTS 944432  6/1956  Fed. Rep. of Germany ........ 211/81

Primary Examiner—Leslie J. Paperner
Attorney, Agent, or Firm—Wenderoth, Lind & Ponack

[57] ABSTRACT

A loading device for holding LP gas cylinders on an industrial vehicle which includes a bottom plate in rectangular form, a rear plate extending upwardly along a rear end side of the bottom plate, and a partition plate extending upwardly at a position separating the bottom plate equally into right and left parts and extending between both longitudinal ends of the bottom plate. Tightening bands, each of which has a tightening fitting at one end portion thereof, and hooks are opposed to each other at a front end portion of the partition plate and both lateral end portions of the rear plate. The loading device can always hold two cylinders which are usable alternately, whereby one cylinder can be always used as a spare cylinder and inconvenience due to lack of fuel can be prevented.

13 Claims, 5 Drawing Sheets

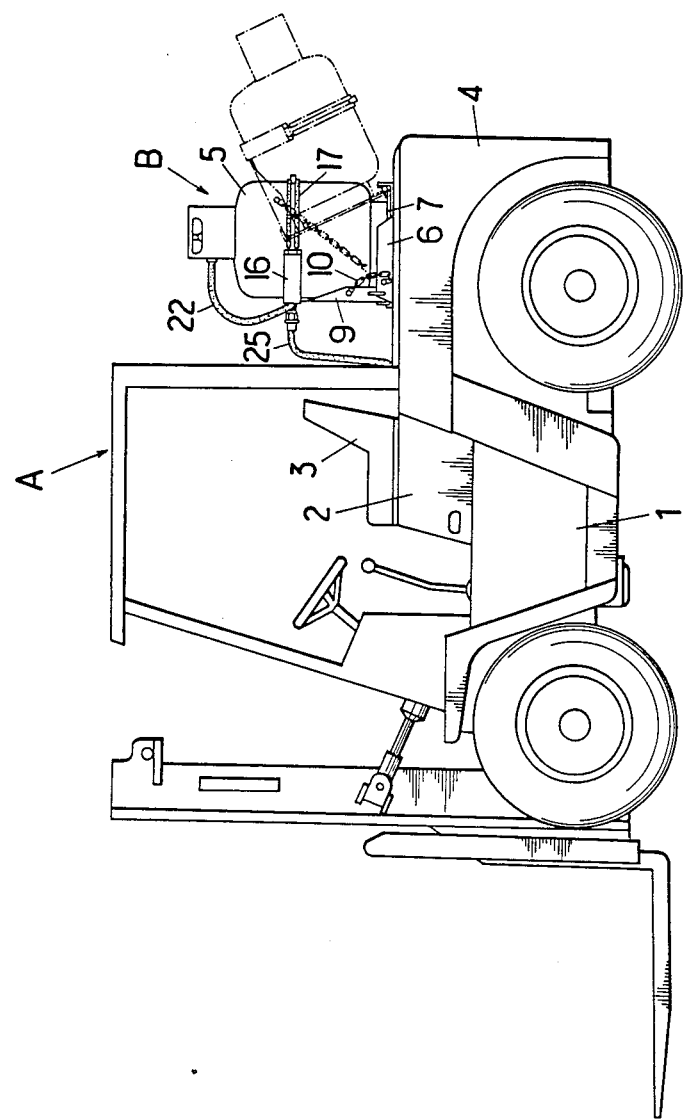

LOADING DEVICE OF LP GAS CYLINDERS

BACKGROUND OF THE INVENTION

1. Field of the Invention

The present invention relates to a loading device of light petroleum gas (LP gas) cylinders when LP gas is used as fuel in industrial vehicles such as a fork lift truck.

2. Description of the Prior Art

Since LP gas is economical in comparison to gasoline or the like and advantageous in that a relatively small amount of harmful substances is contained in the exhaust gas, it is now used also in industrial vehicles such as a fork lift truck.

Since LP gas is filled in an interchangeable cylinder, when the LP gas is used in a fork lift truck, a cylinder must be loaded and therefore a loading device of the cylinder must be installed on the fork lift truck. As a loading device of a cylinder for a fork lift truck in the prior art, that of loading a cylinder in a horizontal state on top of a balance weight has been generally used.

FIG. 7 shows an example of a loading device in the prior art. In FIG. 7, a loading device "a" comprises a support foot part "b" fixed on a balance weight installed at a rear side of a fork lift truck A, and a bracket "d" which is formed in a concave arc shape on the support foot part "b" so as to hold a cylinder "c" such that the cylindrical axis thereof is in a horizontal state. A tightening band "e" is mounted on both longitudinal ends of the bracket "d" so that top end portions can be engaged with each other, and the cylinder "c" can be detachably fixed to the bracket "d" through the tightening action of the tightening band "e".

In such a prior art loading device, however, since a cylinder which can be held on the balance weight is limited to one in number on account of its space (Even if two cylinders can be held in a parallel in horizontal state, the loading and unloading work will become difficult.), the cylinder in an empty state must be immediately replaced by a new cylinder. Consequently, ordinary work such as cargo work must be interrupted temporarily.

In order to decrease the length of interruption of work due to lack of fuel as above described, a cylinder of large capacity is used in the prior art. However, such a cylinder of large capacity has considerable weight and therefore the changing work requires excessive labor.

SUMMARY OF THE INVENTION

An object of the invention is to provide a loading device of LP gas cylinders which can hold two LP gas cylinders such that their cylindrical axes are a in vertical state.

Another object of the invention is to provide a loading device of LP gas cylinders wherein even when a driver seat is brought down rearward for engine inspection of an industrial vehicle, a bottom plate can be slanted forward without being obstructed by the driver seat.

In order to attain the above objects, a loading device of LP gas cylinders in industrial vehicles according to the invention comprises a rear plate extending along a rear end side of a bottom plate in rectangular form, a partition plate extending in position where the bottom plate is equally halved into right and left parts, a space provided on both sides of the partition plate for holding the cylinders with their axes in a vertical state, and tightening bands and hooks for the tightening bands installed in opposition at a top end position of the partition plate and both lateral end portions of the rear plate so as to surround the space, whereby the cylinders can be prevented from being unintentionally removed from the loading device.

BRIEF DESCRIPTION OF THE DRAWINGS

FIG. 1 is a side view of a fork lift truck having a loading device according to the invention;

DESCRIPTION OF THE PREFERRED EMBODIMENTS

Embodiments of the invention will now be described referring to the accompanying drawings.

Figure 7:
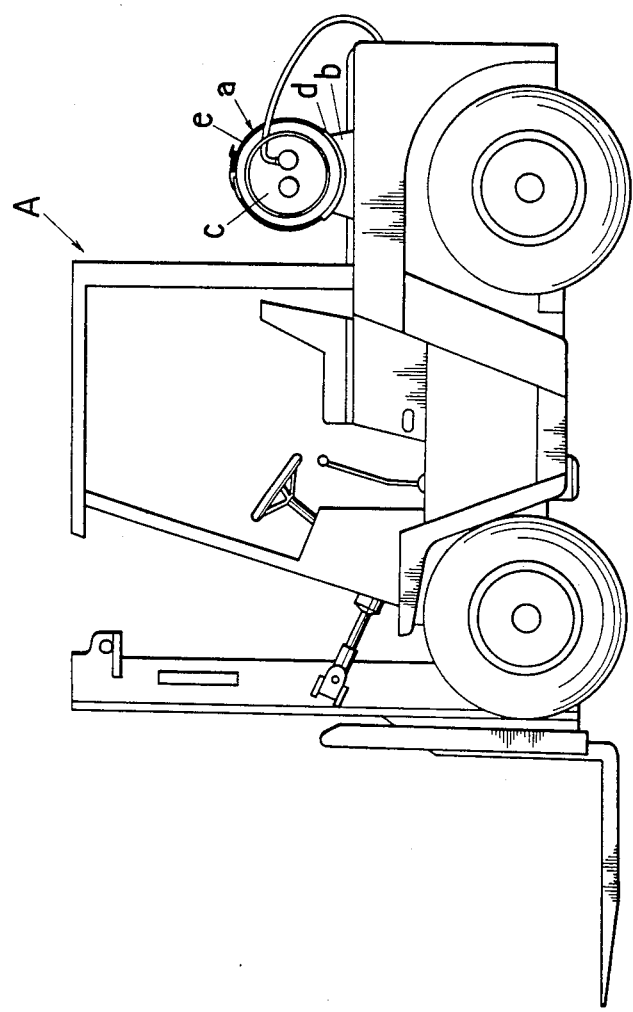
FIG. 7 is a side view of a fork lift truck having a loading device in the prior art.
Figure 2:
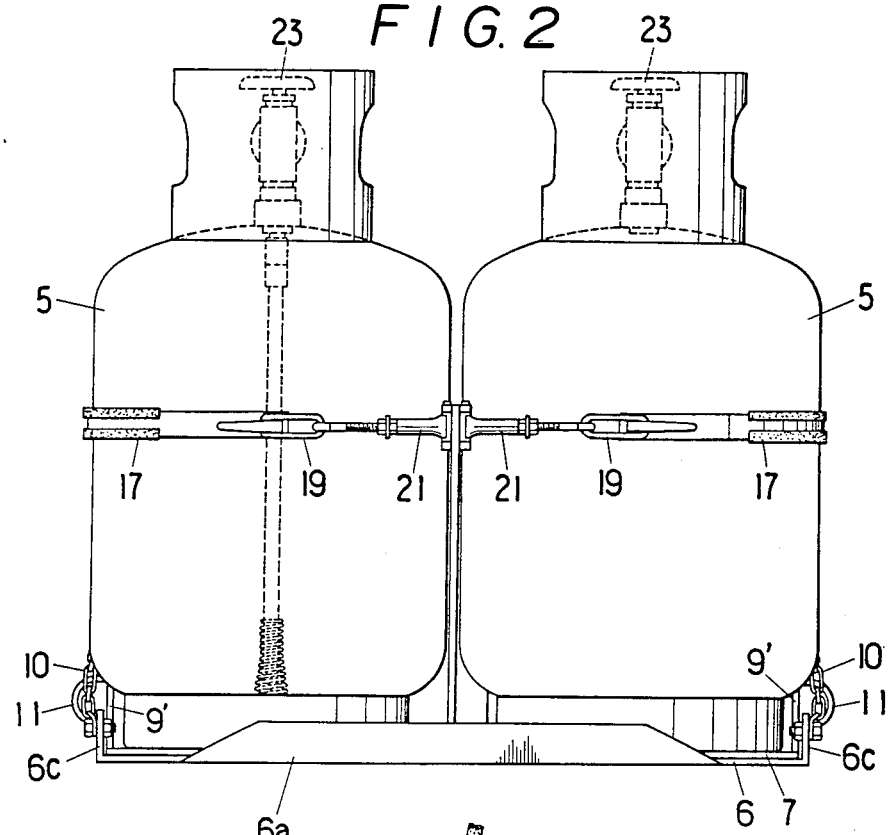
FIG. 2 is a front view of the loading device.
Figure 3:
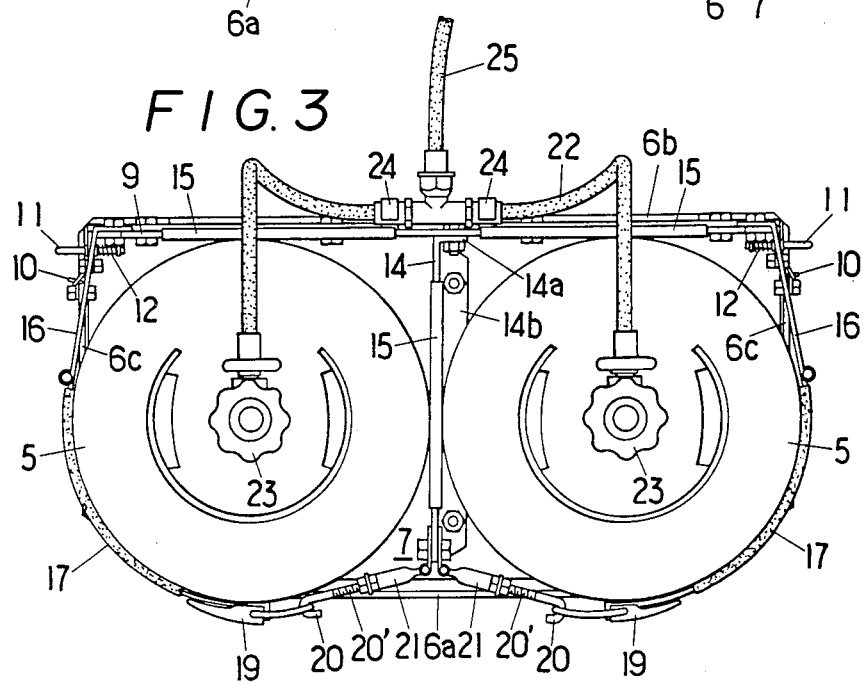
FIG. 3 is a plan view of the loading device.
Figure 4:
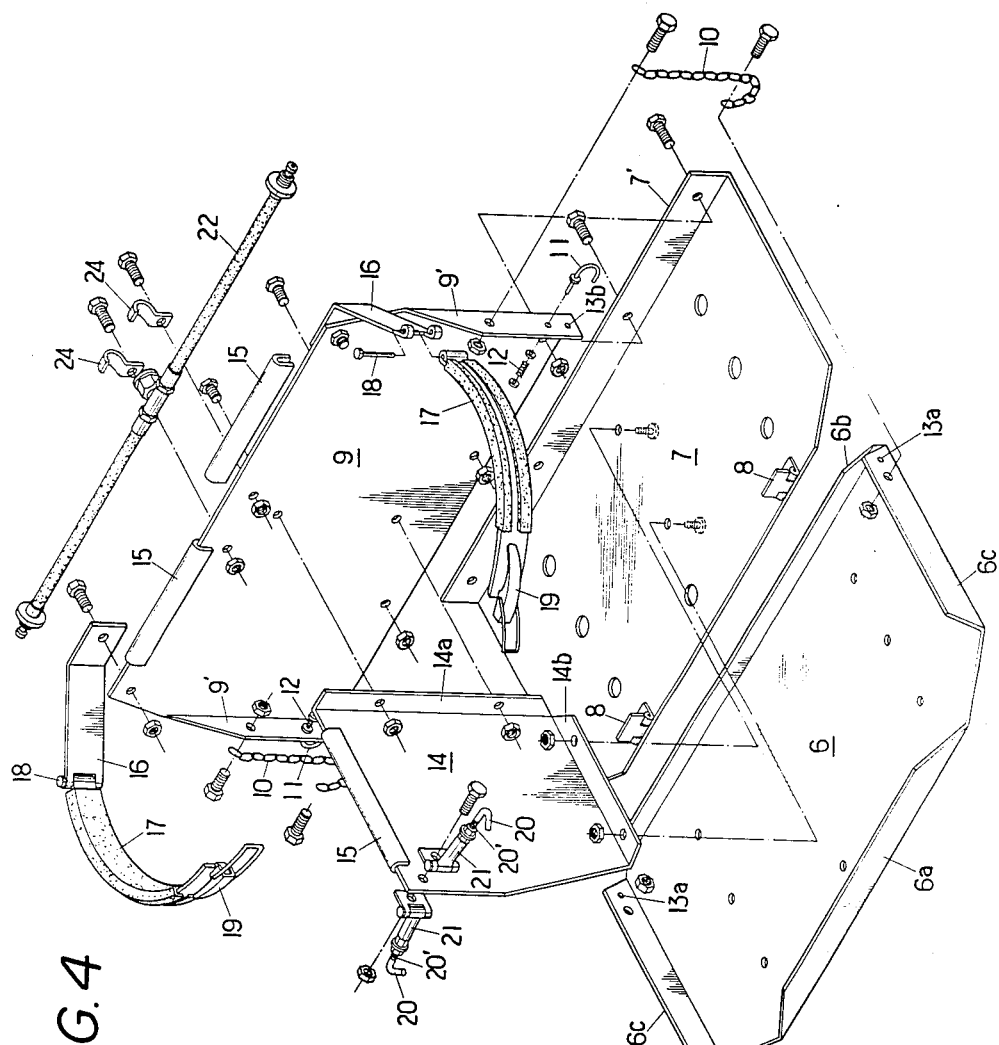
FIG. 4 is an exploded perspective view of the loading device.
Figure 6:
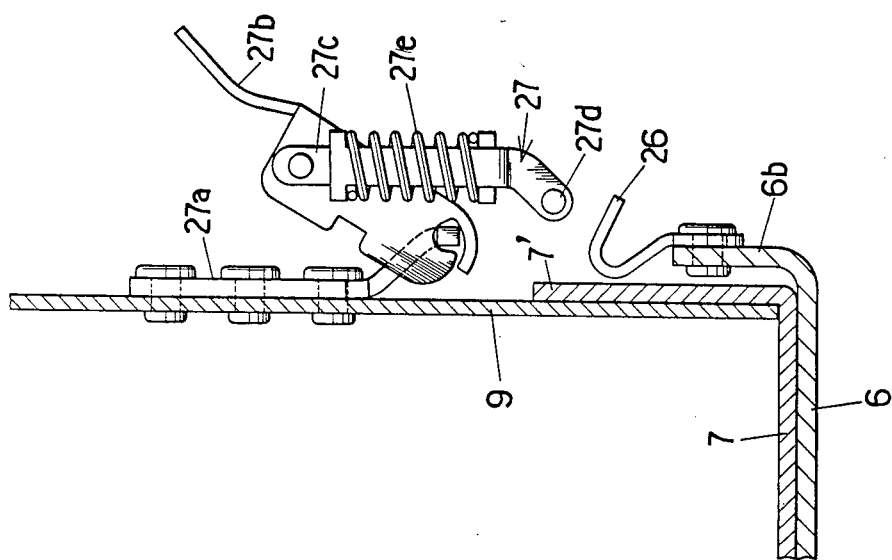
FIG. 6 is a partial side view of the loading device illustrating a mounting state of the hook and the tightening fitting.
Figure 5:
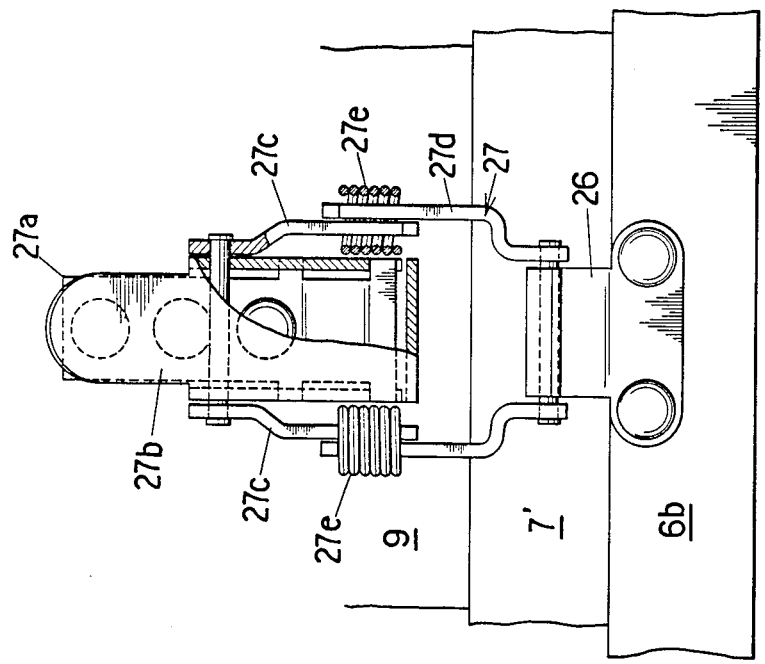
FIG. 5 is a partial rear elevation of the loading device illustrating the state of engagement of a tightening fitting with a hook.

FIG. 1 shows a fork lift truck A as a whole. In FIG. 1, reference numeral 1 designates a body of the fork lift truck A, numeral 2 designates an engine hook, numeral 3 designates a driver seat installed on the engine hood, and numeral 4 designates a balance weight installed on the rear side of the body 1. A loading device B for supporting an LP gas cylinder 5 according to the invention is mounted on the balance weight 4. FIGS. 2 through 6 show the loading device B. FIG. 2 is a front view, FIG. 3 is a plan view, FIG. 4 is an exploded perspective view, FIG. 5 is a partial rear elevation, and FIG. 6 is a partial side view.

In FIG. 1 through 6, numeral 6 designates a mounting substrate fixed on a top end surface of the balance weight 4 in a horizontal state. The mounting substrate 6 is formed in nearly a rectangular shape, and is provided on both opposed longitudinal front and rear ends with flanges 6a, 6b and on both lateral ends with flanges 6c, 6c respectively formed integrally therewith by bending each side end portion upward. A bottom plate 7 is overlaid on the mounting substrate 6. The bottom plate 7 has a space on which two cylinders 5, 5 in a standing state can be held in lateral arrangement to each other, and is formed in nearly rectangular shape. A flange 7' is formed on a rear end portion of the bottom plate 7 integrally therewith by bending a side end portion upward. A front end portion of the bottom plate 7 is pivotally attached to the flange 6a by means of hinges 8, 8 so that the bottom plate 7 can be slanted or tilted by pivoting it forward about the hinges 8, 8 as follows. Chains 10, 10 to restrict the slant or tilt angle of the bottom plate 7 are stretched between the flanges 6c, 6c and flanges 9', 9' of a rear plate 9 as hereinafter described. Fixtures 11, 11 in hook form are also attached to both flanges 9', 9' at a lower end side thereof with coil springs 12, 12 interposed between a base portion of the springs 12 and an inside surface of the flanges 9', 9' so that the fixtures 11, 11 are normally biased towards the inside of the flanges 9', 9'. Inserting holes 13a, 13b; 13a, 13b for the fixtures 11 are bored in the flanges 6c, 6c and in the flanges 9', 9' corresponding to top end portions of the hook-like fixtures 11, 11. The top end portions of the fixtures 11, 11 are normally inserted in the inserting holes 13a, 13b; 13a, 13b, thereby the bottom plate 7 can be fixed in a horizontal state to the substrate 6. A hook 26 is installed at a rear side of the flange 7', and a tightening fitting 27 corresponding to the hook 26 is installed at a rear side of the rear plate 9. The horizontal fixing state of the bottom plate 7 to the mounting substrate 6 may be made stronger through the engagement between the hook 26 and the tightening fitting 27. More specifically, the hook 26 is formed by bending a plate of nearly rectangular shape. The tightening fitting 27 comprises a substrate or bracket 27a fixed to the rear plate 9, a pushing fitting 27b pivotally attached to a bottom end portion of the substrate 27a, a lateral pair of spaced-apart arms 27c, 27c pivotally attached to the pushing fitting 27b at a top end side thereof, and an engaging fitting 27d attached slidably to a top end portion of both arms 27c, 27c. Coil springs 27e, 27e are interposed between stops on spaced-apart extensions of the engaging fitting 27d and stops on lower ends of both arms 27c, 27c. The engaging fitting 27d includes a horizontal bar which is engaged with the hook 26 and the pushing fitting 27b is rotated towards the rear plate 9 against the biasing force of the coil spring 27e whereby a locking state of the tightening fitting 27 can be obtained.

On the other hand, the rear plate 9 comprises a first member which extends vertically upward from the rear end portion of the bottom plate 7, and a partition plate 14 comprises a second member which extends vertically upward at position where the bottom plate 7 is equally halved laterally, and extends between both longitudinal front and rear ends of the bottom plate 7. More specifically, the rear plate 9 has a suitable height and width and is formed in nearly rectangular shape, and a lower end porton of the rear plate 9 is fixed to the flange 7'. The partition plate 14 has the same height as that of the rear plate 9, and is formed in nearly a rectangular shape. A flange 14a is formed by bending the rear end edge of the partition plate 14 to one lateral side and the flange 14a is fixed to the rear plate 9. A flange 14b is formed by bending the lower end edge of the partition plate to one lateral side is fixed to the bottom plate 7. A separate padding plate 15 having a cross-section of approximately U-like form is placed over an upper edge portion of the rear plate 9 and the partition plate 14.

Fixtures 16, 16 are installed on both lateral ends of the rear plate 9 and are bent from an upper end portion of the rear plate 9 to oblique forward directions. Base portions of tightening bands 17, 17 are pivotally attached to free end portions of the fixtures 16, 16 through pins 18, 18 respectively and so as to be rotatable in the horizontal direction. The tightening band 17 is curved in an arch form along a trunk portion of the cylinder 5, and a tightening fitting 19 is connected to a free end portion of each tightening band 17. A hook 20 which is engageable with the tightening fitting 19 is pivotally attached to a front end portion of the partition plate 14 and is rotatable in the horizontal direction with its length being adjustable. More specifically, a male screw 20' is threaded on a trunk of each hook 20 and threadedly engaged with a free end portion of a fixture 21 which is pivotally attached to the front end portion of the partition plate 14 and rotatable in the horizontal direction, whereby each hook 20 is rotatable in the horizontal direction with its length being adjustable.

In the loading device B according to the invention as shown in FIG. 4, various parts such as the bottom plate 7, the rear plate 9, the partition plate 14 and the like can be assembled and disassembled through engagement of bolts and nuts. In FIG. 4, numeral 22 designates a coupling hose both ends of which are threadedly engaged with valves 23, 23 of the two cylinders 5, 5. The coupling hose 22 is mounted on upper end portion of the rear plate 9 through fixtures 24, 24. Numeral 25 designates a fuel hose, and one end of the fuel hose 25 is connected to an intermediate portion of the coupling hose 22 and the other end thereof is connected to a carburetor (not whown).

A method of using the apparatus disclosed in the above embodiment will now be described.

As shown in FIG. 1, when the mounting substrate 6 of the loading device B is fixed on the balance weight 4 of the fork lift truck A, the cylinders 5, 5 are held on both lateral sides of the bottom plate 7 and the tightening fittings 19, 19 of the tightening bands 17, 17 are engaged with the hooks 20, 20 respectively and hooked, thereby the cylinders 5, 5 are clamped against the rear plate 9 and the partition plate 14 through the tightening action of the bands 17, 17 so as to fix the cylinders 5, 5. When the cylinders 5, 5 are fixed in such manner, both ends of the coupling hose 22 are threadedly engaged with the valves 23, 23 of the cylinders 5, 5 whereby LP gas can be forwarded to the fuel hose 25 connected to the coupling hose 22 from either of the right and left cylinders 5, 5. Consequently, when one cylinder 5 becomes empty, the valve 23 of other cylinder 5 is opened whereby the fuel can be supplied continuously.

On the other hand, in order to change the empty cylinder 5, the engagement between the hook 20 and the tightening fitting 19 is released whereby the cylinder 5 can be easily removed. In the fork lift truck A, an inspection port for access to the engine part is located at the upper end surface of the engine hood 2 and is normally closed by the driver seat 3. When the engine part is inspected, the driver seat 3 is brought down rearward and the inspection work is performed. In such inspection work, the bottom plate 7 is slanted forward whereby the driver seat 3 can be brought down smoothly without impinging on the loading device B. That is, during the normal state, the bottom plate 7 is locked doubly in a horizontal state to the mounting substrate 6 through the engaging action of the fixture 11 in the inserting holes 13a, 13b and engaging action of the tightening fitting 27 with the hook 26. During inspection, however, the double lock state of the fixture 11 and the tightening fitting 27 is released, and the bottom plate 7 is tilted as shown in the dash-and-dot line of FIG. 1 whereby the loading device B can be rotated rearwardly. Also the loading device B can be held in the tilted position by the chains 10, 10.

Although the loading device B is held in a definite tilted position when tilted forward by the chains 10 in the above mentioned embodiment, in place of the chains 10, for example, both ends of two link rods formed so as to be folded into two may be rotatably attached to the mounting substrate 6 and the bottom plate 7, respectively. The loading device need not always have a function of pivoting the bottom plate 7 such as in the case of a vehicle other than the fork lift truck or depending on the mounting position. In such case the mounting substrate 6 is not used but the bottom plate 7 can be mounted directly on the vehicle body. Furthermore, although the tightening band 17 is installed at a side of the rear plate 9 and the hook 20 is installed at a side of the partition plate 14 in the above-mentioned embodiment, the invention is not limited to this but the tightening band 17 and the hook 20 may be reversed in their mounting positions.

In the invention of above-mentioned constitution, the two cylinders are held in a vertical state on the balance weight. Accordingly, the invention has the following effects:

(1) Since two cylinders can always be loaded, there is no fear of lack of fuel during the work.

(2) Since a cylinder to be loaded may be relatively small, changing of the cylinder is simple and excessive labor is not required.

While the present invention has been described with reference to the foregoing embodiments, it will be understood that various changes and modifications may be made thereto which fall within the scope of the appended claims.

What is claimed is:

1. A loading device for holding LP gas cylinders on an industrial vehicle, said loading device comprising:
    a bottom plate;
    a mounting substrate installed under the bottom plate, a portion of the bottom plate and a portion of the mounting substrate being pivotally attached together by hinge means so that the bottom plate can be tilted;
    a rear plate extending upwardly from the bottom plate;
    a partition plate extending upwardly from the bottom plate and separating the bottom plate into right and left parts; and
    clamping means for removably holding an LP gas cylinder on either side of the partition plate, the clamping means comprising tightening bands and hooks engageable with respective tightening fittings attached to the tightening bands, the tightening bands and hooks being attached to a front end portion of the partition plate and both lateral end portions of the rear plate.

2. A loading device as set forth in claim 1, wherein means for restricting the tilt angle of the bottom plate is provided extending between the bottom plate and the mounting substrate.

3. A loading device as set forth in claim 2, wherein said means for restricting the tilt angle of the bottom plate is a chain.

4. A loading device as set forth in claim 1, wherein means for holding the bottom plate in parallel to the mounting substrate is provided.

5. A loading device as set forth in claim 1, wherein the bottom plate, the rear plate, the partition plate, and the tightening bands and hooks can be assembled and disassembled through engagement of bolts and nuts.

6. A loading device for holding LP gas cylinders on an industrial vehicle comprising:
    a bottom plate of rectangular configuration;
    a mounting substrate disposed beneath said bottom plate and fixed on a balance weight of the industrial vehicle, the bottom plate having a front end portion thereof pivotally attached to a front end portion of said mounting substrate by means of a hinge whereby said bottom plate can be tilted forward;
    a rear plate extending upwardly from a rear end portion of said bottom pate;
    means for molding said bottom plate in parallel to said mounting substrate, said means for holding said bottom plate in parallel to said mounting substrate comprising a fixture for engaging said bottom plate with said mounting substrate and a tightening fitting for engaging said rear plate with said mounting substrate;
    a partition plate extending upwardly from said bottom plate between said front and rear end portions thereof and separating said bottom plate into equally sized right and left parts; and
    tightening bands having tightening fittings engageable with hooks, said tightening bands and said hooks being attached to a front end portion of said partition plate and both lateral end portions of said rear plate for removably clamping an LP gas cylinder on each side of said partition plate.

7. A loading device for holding fluid tanks such as LP gas cylinders and which can be mounted on an industrial vehicle such as a fork lift, the loading device comprising:
    a mounting substrate;
    a bottom member pivotally attached to said mounting substrate about a substantially horizontal pivot axis;
    a first upwardly extending member fixed to said bottom member, said first upwardly extending member extending laterally in a direction parallel to said pivot axis;
    a second upwardly extending member fixed to said bottom member, said second upwardly extending member extending laterally in a direction perpendicular to said first upwardly extending member and dividing said bottom member into a first fluid tank holding area on one side of said second upwardly extending member and a second fluid tank holding area on the other side of said second upwardly extending member;
    means extending between said first upwardly extending member and said second upwardly extending member for clamping a fluid tank in said first fluid tank holding area and for clamping another fluid tank in said second fluid tank holding area;
    a first means extending between said first upwardly extending member and said mounting substrate for preventing pivotal movement of said bottom member with respect to said mounting substrate; and
    a second means extending between said first upwardly extending member and said mounting substrate for preventing pivotal movement of said bottom member with respect to said mounting substrate.

8. The loading device of claim 7, wherein said clamping means comprises a first hook attached to one of said first upwardly extending member and said second upwardly extending member and a first tightening band having a tightening fitting engageable with said first hook attached to the other of said first upwardly extending member and said second upwardly extending member, said first hook and said first tightening band being located on said one side of said second upwardly extending member, said clamping means further comprising a second hook attached to one of said first upwardly extending member and said second upwardly extending member and a second tightening band having a tightening fitting engageable with said second hook attached to the other of said first upwardly extending member and said second upwardly extending member, said second hook and said second tightening band being located on said other side of said second upwardly extending member.

9. The loading device of claim 7, wherein said first means comprises a spring biased hook having a free end thereof engageable with an aperture in one of said mounting substrate and said first upwardly extending member, said spring biased hook being mounted on the other of said mounting substrate and said first upwardly extending member such that said free end of said spring biased hook is urged into engagement with said aperture when axially aligned therewith.

10. The loading device of claim 7, wherein said second means comprises a hook attached to one of said mounting substrate and said first extending member and a tightening fitting engageable with said hook attached to the other of said mounting substrate and said first upwardly extending member, said tightening fitting including an engaging fitting movable toward and away from said hook for engagement therewith.

11. The loading device of claim 10, wherein said tightening fitting includes a bracket mounted on said first upwardly extending member, a pushing fitting pivotally attached to said bracket, a pair of spaced-apart arms pivotally attached at first ends thereof to said pushing fitting, said engaging fitting including a pair of spaced-apart extensions overlying said arms, said arms including stops and said extensions including stops spaced apart from said stops on said arms, and said tightening fitting further including a coil spring surrounding each respective overlying pair of said arms and said extensions with opposite ends of said spring engaging said spaced-apart stops on said arms and said extensions to bias said engaging fitting away from said pushing fitting.

12. The loading device of claim 7, wherein said clamping means comprises a pair of hooks, each of which is pivotally attached to said second upwardly extending member, said clamping means further comprising a pair of tightening bands, each of which is pivotally attached to a respective lateral end of said first upwardly extending member, each of said tightening bands including a tightening fitting engageable with a respective one of said hooks.

13. The loading device of claim 7, wherein a chain extends between said first upwardly extending member and said mounting substrate for limiting pivotal movement of said bottom member with respect to said mounting substrate.

* * * * *